Feb. 19, 1924.

S. FLOOD 1,484,325

APPARATUS FOR TREATING PLASTIC SUBSTANCES

Filed Oct. 19. 1921   9 Sheets-Sheet 1

WITNESSES.
Herbert White.
Leslie Walker.

INVENTOR
Samuel Flood

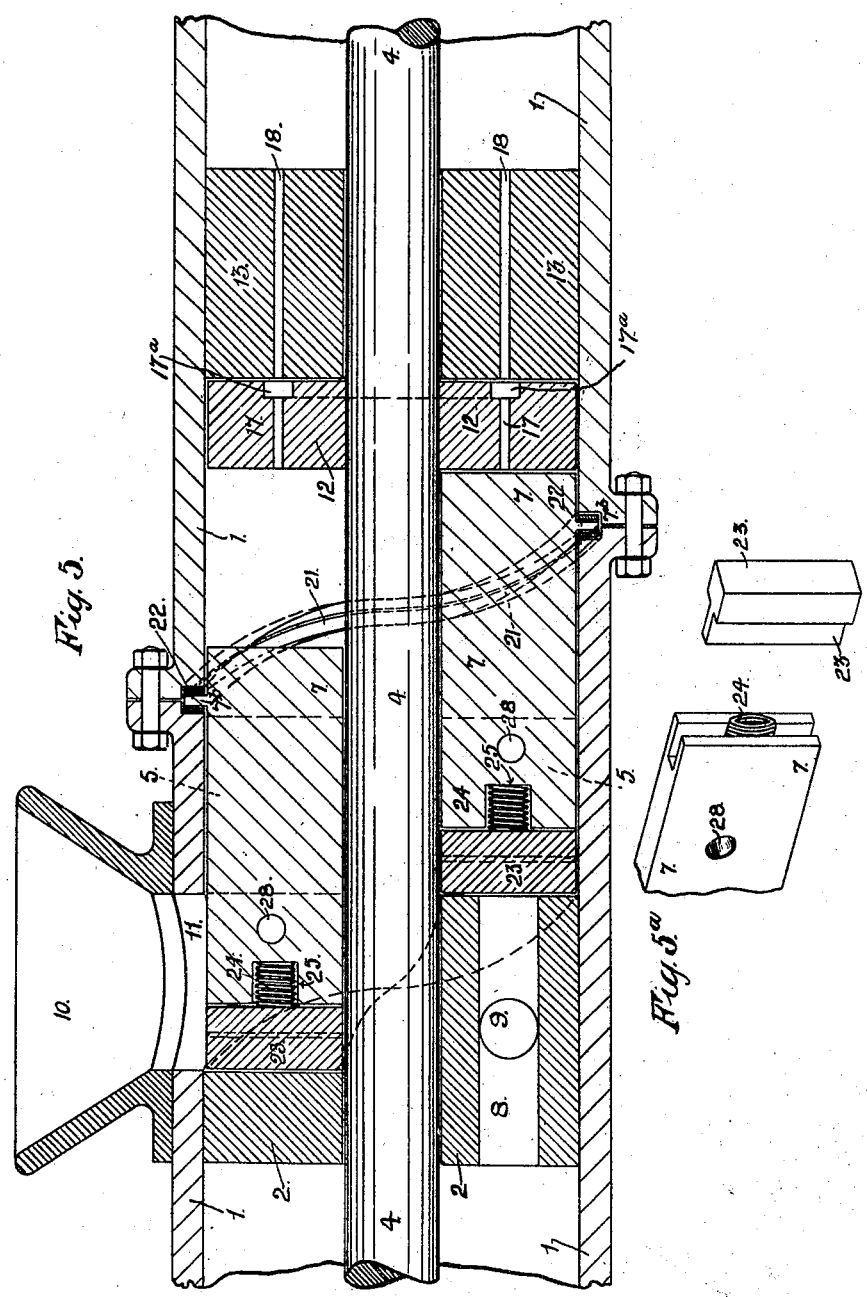

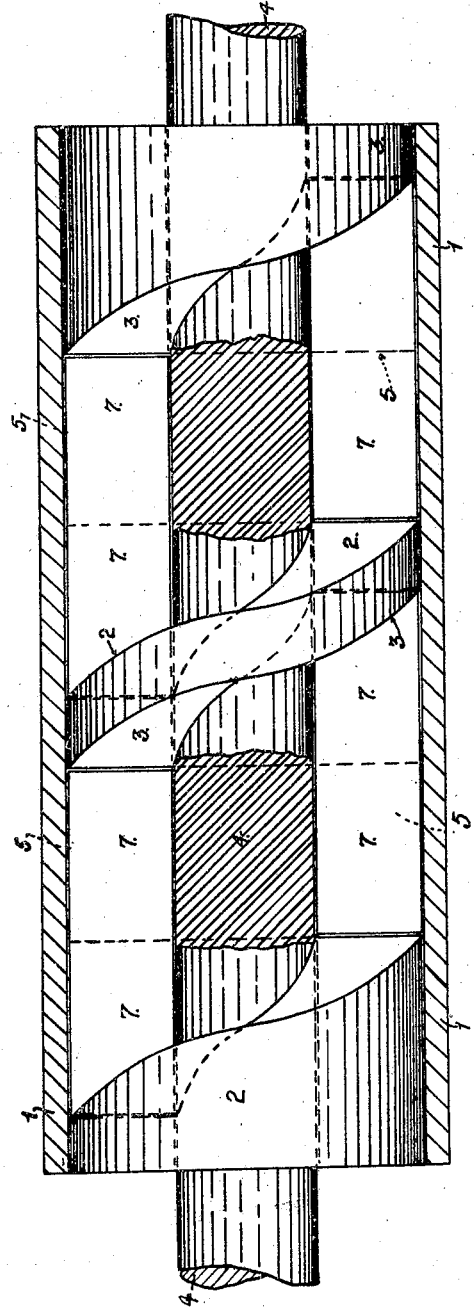

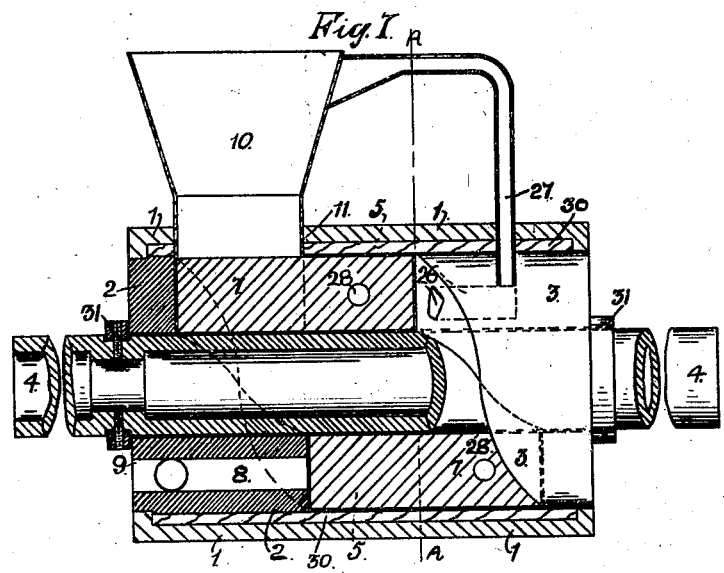
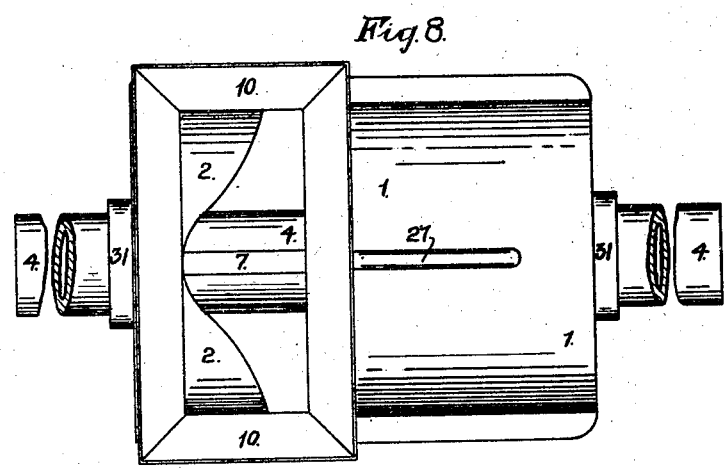

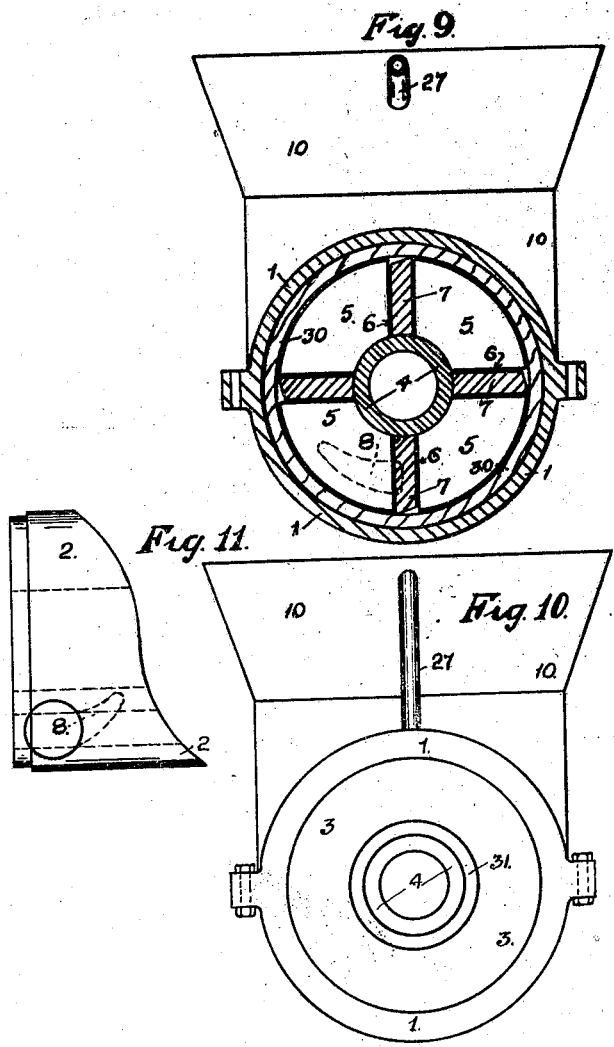

Feb. 19, 1924.
S. FLOOD
1,484,325
APPARATUS FOR TREATING PLASTIC SUBSTANCES
Filed Oct. 19, 1921   9 Sheets-Sheet 6
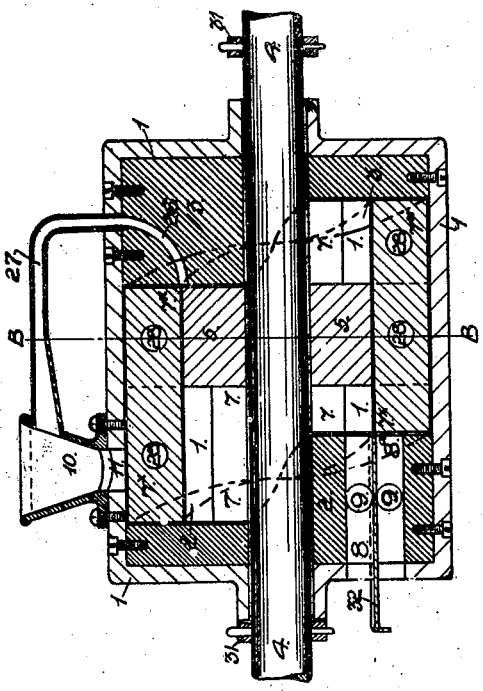
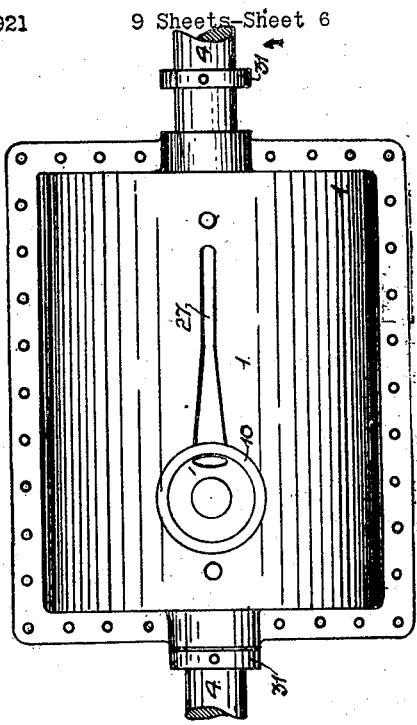
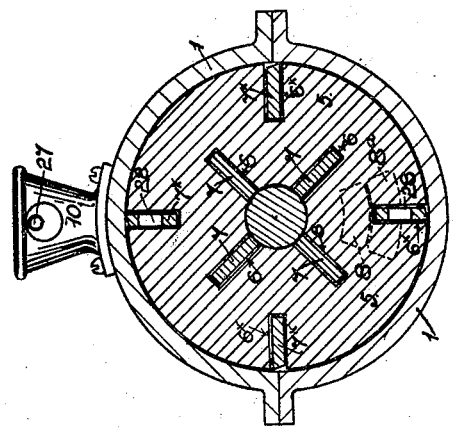
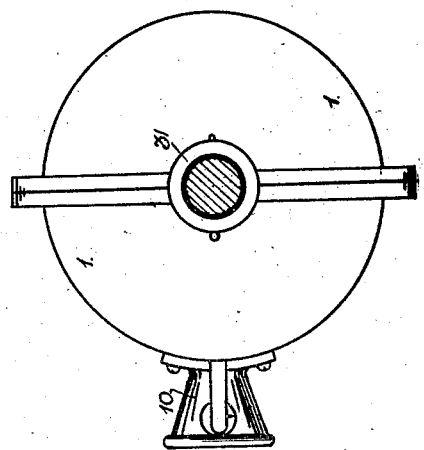
WITNESSES.
Hubert White.
Leslie Walker.
INVENTOR.
Samuel Flood Feb. 19, 1924.  1,484,325
S. FLOOD
APPARATUS FOR TREATING PLASTIC SUBSTANCES
Filed Oct. 19, 1921   9 Sheets-Sheet 7
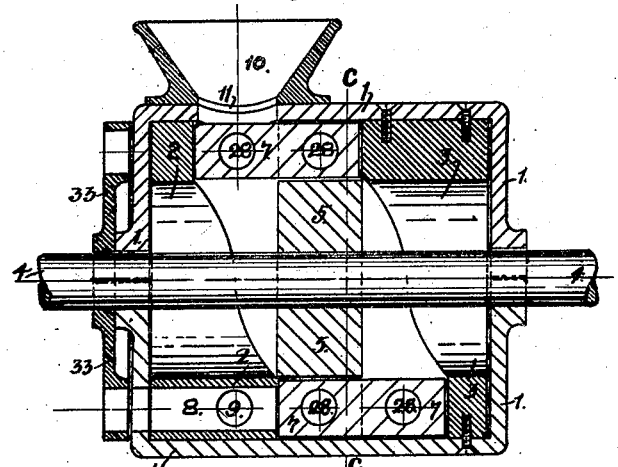
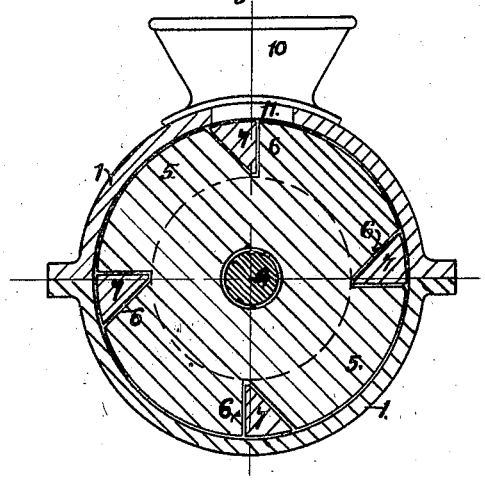
WITNESSES.
Herbert White.
Leslie Walker
INVENTOR.
Samuel Flood

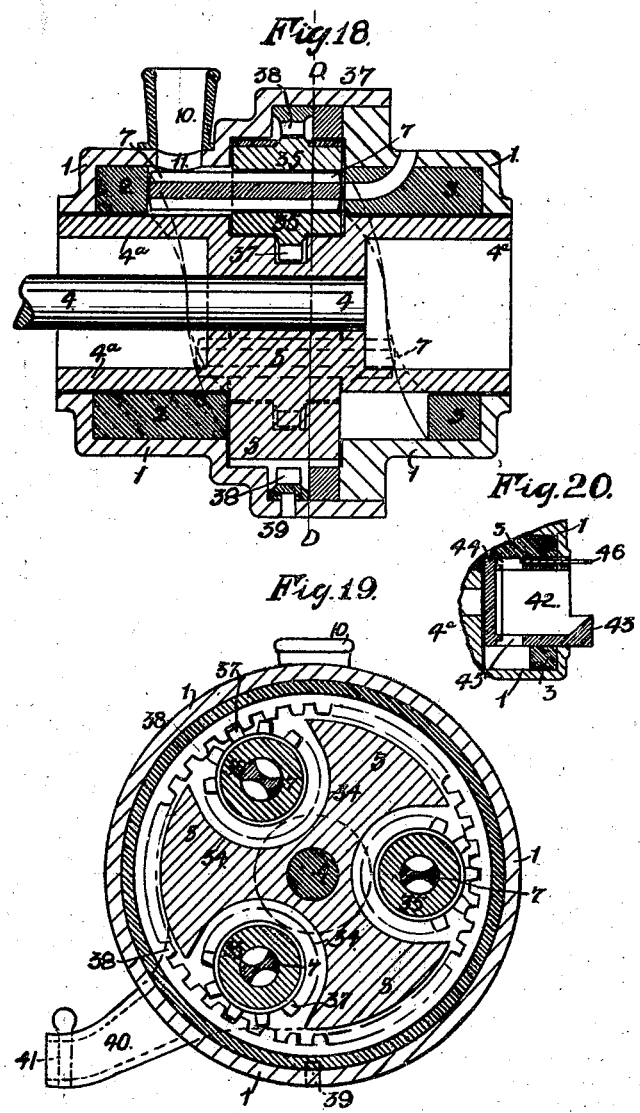

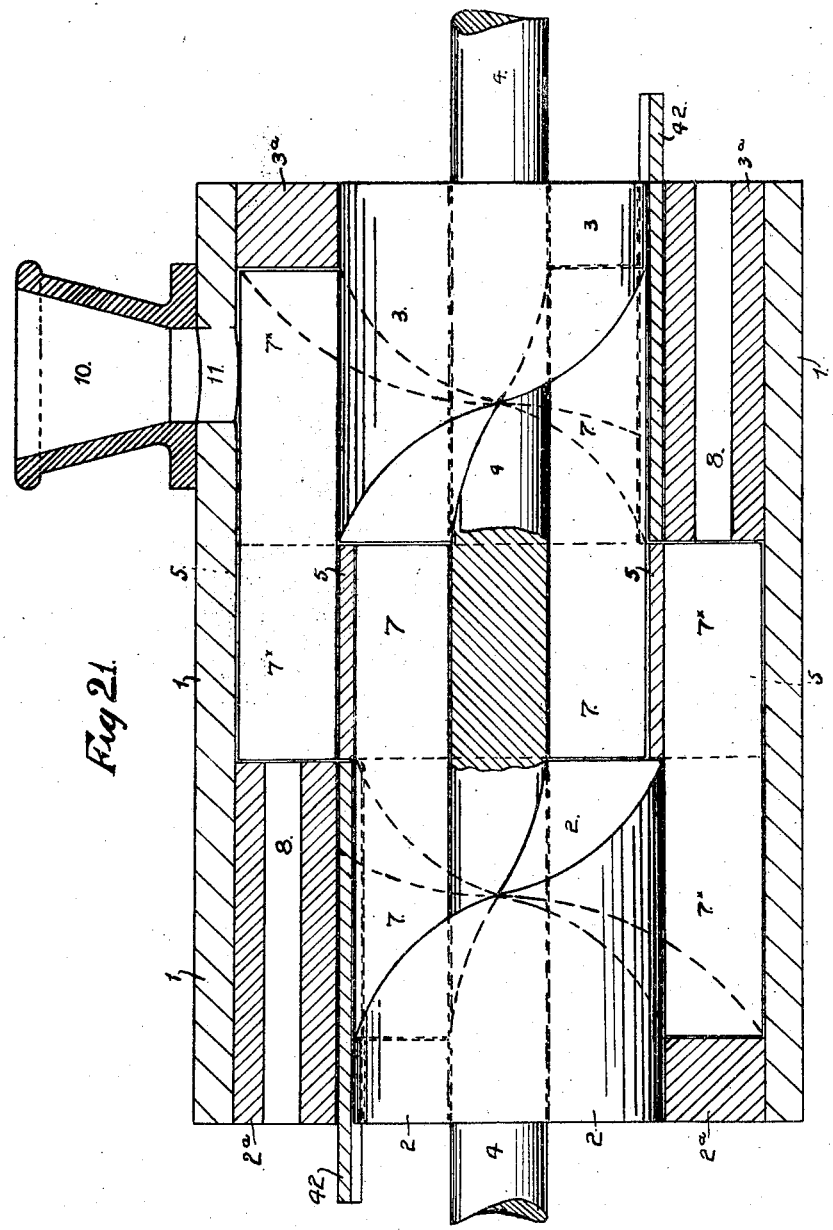

Patented Feb. 19, 1924.

1,484,325

UNITED STATES PATENT OFFICE.

SAMUEL FLOOD, OF LIVERPOOL, ENGLAND.

APPARATUS FOR TREATING PLASTIC SUBSTANCES.

Application filed October 19, 1921. Serial No. 508,765.

*To all whom it may concern:*

Be it known that I, SAMUEL FLOOD, a subject of the King of England, residing at Drury Buildings, Water Street, Liverpool, in the county of Lancaster, England (late of 87 Woodhall Road, Stoneycroft, Liverpool, in the county of Lancaster, England,) have invented certain new and useful Improvements in or Relating to Apparatus for Treating Plastic Substances, such as Margarine, Paste, Fats, Fruits, and Vegetables, of which the following is a specification.

This invention relates to a rotary machine or apparatus for treating—as by mixing, kneading, blending or extruding—plastic substances.

A machine or apparatus, according to my invention, essentially comprises, in combination, a casing or receptacle wherein is disposed an element possessing a face which deviates from a plane at right angles to its axis, or is "cam" shaped; an element or elements in which, or in each of which, a slot or slots or passages is or are formed; a blade, plates, or the like, slidably disposed in said passage, or in each of said passages; and means whereby said blade or blades or plates, or the like, is or are maintained in continuous contact or juxtaposition with said "cam" shaped element: said passaged element or elements, or said "cam" shaped element, or each being adapted to revolve so that material to be treated on being admitted into said casing is swept by said blade or blades or plates, or the like, towards and through a suitable discharge passage or orifice arranged at or near a "peak" location of said "cam" shaped element.

According to one mode of carrying out my invention:—

There is provided a cylindrical casing wherein is longitudinally disposed a central shaft, so that an annular space is created between said casing and shaft; on said shaft a concentric enlargement or collar is formed or provided, which enlargement is preferably adapted to make a good rubbing fit with the interior wall of said casing, or enters a recess provided therein, and in same are formed slots or passages which may be either straight and radial in their depth or of helical formation: in each of the passages of said shaft enlargement or collar a blade or plate is slidably disposed. A "cam" shaped member through which said central shaft extends is fixedly secured in said casing, the inner face of which "cam" shaped member deviates from the plane at right angles to the axis of the shaft, being, by way of example, composed of two helical curves of equal and opposite pitch, and means—such as hereinafter described—are provided whereby said blades or plates are maintained in continuous contact or juxtaposition with said "cam"-shaped member. A discharge passage is formed in the "cam"-shaped member or is provided in the casing at or near the peak of the curves.

On said shaft being revolved, material fed into the casing between said "cam"-shaped member and the opposing face of the shaft enlargement or collar is swept or carried by a blade or plate to and through the discharge passage or orifice, and if said blades or plates are sufficiently close together the reduction in volumetric capacity of the chambers formed by adjacent blades or plates causes the material contained in said chambers to be compressed prior to reaching the extrusion or discharge passage or opening.

In an alternative arrangement a blade or plate carrying element is secured within a stationary casing or a part thereof, and said "cam"-shaped member is revoluble. Or a blade or plate carrying element with the casing or a part thereof is revoluble and the "cam"-shaped member stationary. Or the casing or a part thereof with blade or plate carrier and the "cam"-shaped member may be adapted to revolve in contrary direction. Or, again, said blade or plate carrying member may be constructed in two concentric portions, blades or plates being slidably disposed in each, the outer portion of the blade or plate carrier being attached to the casing or a part thereof and the inner portion being attached to the shaft.

I will further describe my invention with the aid of the accompanying sheets of explanatory drawings, which illustrate, by way of examples only, several modes of embodying same.

In said drawings:—

Figs. 1, 2, 3, 4, 5, and 6, illustrated by longitudinal sections machines or apparatuses according to various modes of carrying out my invention.

Fig. 7 is a longitudinal section, Fig. 8 a plan,

Fig. 9 a transverse section taken as on line A—A Fig. 7.

Fig. 10 an end view, and Fig. 11 a detail, of a machine or apparatus according to a further modification.

Fig. 12 is a longitudinal section, Fig. 13 a plan, Fig. 14 a transverse section taken as on line B—B, Fig. 12, and Fig. 15 an end view of a machine or apparatus according to a further modification.

Fig. 16 is a longitudinal section and Fig. 17 a transverse section taken as on line C—C, Fig. 16 of a machine or apparatus according to a further modification.

Fig. 18 is a longitudinal section and Fig. 19 a transverse section taken as on line D—D, Fig. 18 of a machine or apparatus according to a further modification; Fig. 20 illustrating modified means for loading and discharging the machine.

Fig. 21 is a longitudinal section of a machine or apparatus according to a further modification.

In the several views like characters of reference denote like or equivalent parts wherever they occur.

Figure 1:
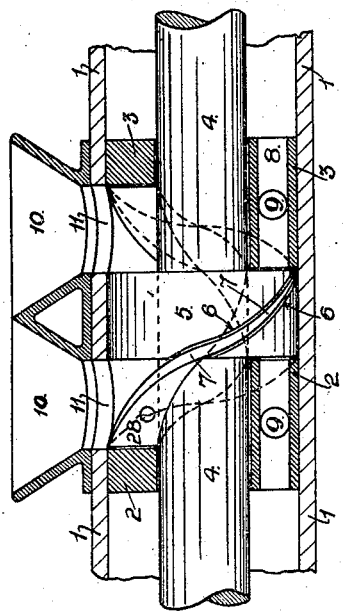

Referring to the drawings, but first more particularly to the duplex machine or apparatus shown in Fig. 1:—There is provided a cylindrical casing 1 of metal or other suitable material, in the ends whereof are fixedly secured "cam"-ring members 2, 3, respectively, each of the opposing faces whereof being shaped into two helical curves of equal and opposite pitch, and said "cam"-shaped members being so positioned that the peak of the curves of one is in alignment or coincidence with the peak of the curves of the other. Extending longitudinally through said casing 1 and "cam"-shaped members 2, 3, is a central shaft or spindle 4 whereon is integrally formed or is secured a concentric enlargement or collar 5 which extends to and makes a good rubbing fit with the inner wall of the cylindrical casing 1, and in said enlargement or collar 5 there are cut a plurality (two in this case) of helically-formed slots 6 in each of which a correspondingly shaped blade or plate 7 is slidably disposed, the latter being of such length that the respective ends contact or almost contact with said "cam"-shaped members 2, 3, in each of which, at the peak of the curves, there is formed a passage 8 containing a cock 9. Upon said cylindrical casing 1 there is secured a structure which includes a pair of hoppers 10, 10 adapted to communicate with the interior of the casing 1, respectively, on either side of the shaft enlargement or collar 5, through openings 11, 11.

When said central shaft 4, with concentric enlargement or collar 5 is rotated by any convenient means, material fed into cylindrical casing 1 through the hoppers 10, 10 is swept by the blades or plates 7 to and through the appropriate cam passages.

It will be seen that, due to the contour of the opposing faces of said "cam"-shaped members 2, 3, said blades or plates 7 are in a continuous state of reciprocal motion or travel in their slots 6 of the shaft enlargement or collar 5, and if three or more equidistantly spaced blades or plates are provided (instead of the two, as shown) due to the reduction in volumetric capacity of the chambers created between adjacent blades as they move towards the peaks of the cam ring curves, the material is compressed prior to reaching a discharge or extrusion passage 8.

Figure 2:
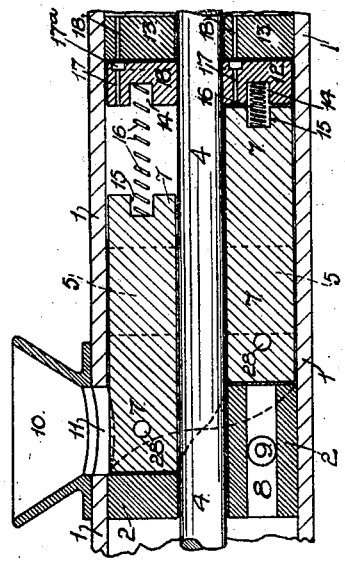

In the modification illustrated in Fig. 2, one cam 2 only is employed. There is affixed to the revoluble shaft 4 a disc 12 which abuts against a bearing 13 secured within the cylindrical casing 1; within said disc 12 recesses 14 are formed, and in the blades or plates 7— which are straight in this instance—there are provided corresponding recesses 15. Located in said recesses 14, 15 of said disc and blades or plates respectively are compression springs 16 which tend to maintain said blades or plates in contact with the double helical face of the "cam"-shaped member 2.

The action of this machine is similar to that already described, material fed into the cylindrical casing 1 through hopper 10 being—if three or more blades or plates 7 are employed—compressed in the chambers formed between adjacent blades or plates before being discharged or extruded through the passage 8 located at the peaks of the two curves of the "cam"-shaped member 2. In said disc 12 there are formed passages 17 and circular groove 17ª with which said passages communicate, and in the bearing 13 are formed passages 18; said passages with circular groove permit of the continuous discharge of any material which may, in the operation of the machine, work its way behind the blades or plates 7, and, in the absence of relief, might tend to choke the machine.

Figure 3:
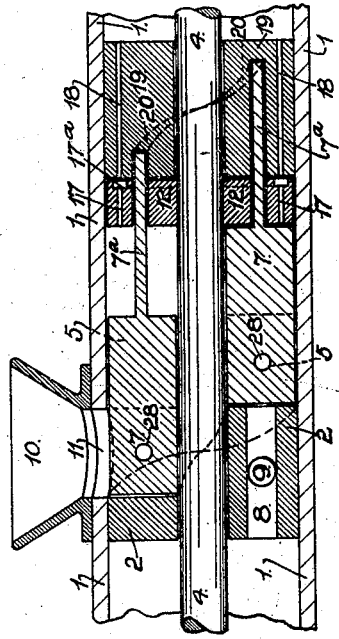

In the modification illustrated in Fig. 3, a single "cam"-shaped member 2 and straight blades or plates 7 are employed; but in lieu of springs to effect the "return" motion of the blades or plates 7, that is, to maintain same in contact or juxtaposition with the "cam"-shaped member 2, there is formed in a stationary end piece 19 a double helical groove 20 into which project—through a bearing disc 12 secured to said revoluble shaft 4—extensions 7ª of straight blades or plates 7; thus said blades or plates are positively actuated in each stroke, as in the construction shown in Fig. 1.

Figure 4:
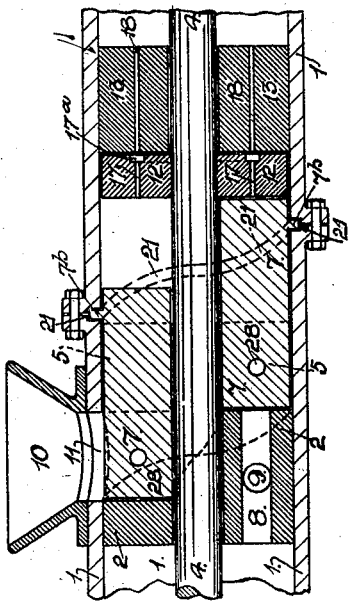

In the modification illustrated in Fig. 4, the construction is similar to that shown in Fig. 3, an exception being that a double helical groove 21 is formed in the inner wall of casing 1 and lateral projections 7$^b$ are provided on the blades or plates 7, which projections engage in said casing groove 21 to positively ensure the "return" movement of the blades or plates 7.

In the modification illustrated in Figs. 5 and 5$^a$ the construction is similar to that shown in Fig. 4, but, in this case, in order to obviate friction, rollers 22 are provided on the lateral blade or plate projections 7$^b$ which engage in the double helical slot 21 of casing 1; and there is provided in the front portion of each blade or plate 7 a loose nose piece 23 which is adapted to contact with the face of the "cam" member 2 under the influence of a compression spring 24 located in a recess 25 formed in the blade or plate 7.

In the modification illustrated in Fig. 6, there is illustrated a convenient method of embodying in one structure a comparatively large number of machine units. In this arrangement, the intermediate ring members are so formed that in respect of one face they constitute a "cam"-shaped member 3, and in respect of the other face they constitute a "cam"-shaped member 2.

In the modification illustrated in Figs. 7 to 11, the reciprocation of the straight blades or plates 7 is positively effected by helically faced "cam"-shaped members 2, 3; central shaft 4 is tubular to admit of steam heating, if required; and, for the relief of material which may work behind the blades or plates 7, a port 26 is provided in cam 3, through which port and a conduit 27 such material is returned to the hopper 10. Ports 28 may be provided in the blades or plates 7 (see also the preceding figures) in order to obviate the subjection of the material being treated to excessive pressure.

A liner 30 is fitted in the casing 1, and said shaft 4 is prevented from longitudinal displacement by means of collars 31.

Referring to the modification illustrated in Figs. 12 to 15, in order to increase the capacity of the machine, and to retain the material being worked until the process is completed, clearance is provided for between the cam shaped faces and said enlargement or collar 5, longitudinal motion being imparted to said central shaft 4 at desired times, and such movement being limited or controlled by the collars 31 thereon. Additional blades or plates 7$^x$ operating in slots 6$^x$ of said enlargement or collar 5 are provided. 32 denotes a slidable fin-like piece which divides the total area of the discharge passages into two portions as indicated by 8, 8$^a$; said fin also makes chamber-like spaces at the time of extrusion and when the blades or plates are passing the vicinity of the passages. At the time of discharge said fin is moved in the direction of the enlargement or collar 5.

In operation, the material to be treated is fed from the hopper 10 into the revolving machine until it is fully charged, and rotation is continued until the material is sufficiently worked by the action of the double row of blades or plates 7, 7$^x$, which tend to force the material through the contracted area 8, 8$^a$ in the peak of cam 2.

When the treatment is completed cocks 9 are opened and longitudinal motion is imparted to the central shaft 4 which brings the enlargement or collar 5 into contact with the peak of the cam 2, with the result that the discharge of the material commences immediately through the passage 8, 8$^a$. A relief passage 26 is provided in the opposing cam 3 which passage communicates with a conduit in the casing and with a pipe 27 communicating with said hopper 10.

In a modification said enlargement or collar 5 may be, in effect, divided into two concentric portions the portion containing the blades or plates 7$^x$ being rotated in the contrary direction to the portion containing the blades or plates 7; the outer portion will be secured to a belt of the casing which will revolve.

In the modification illustrated in Figs. 16 and 17, blades or plates 7 are reciprocated between "cam"-shaped members 2, 3, said blades or plates are substantially triangular in shape and adapted to slide in correspondingly shaped slots 6 in the enlargement or collar 5. Secured to said shaft 4 is a revoluble cutter 33 which severs the material as it is extruded from the machine.

Referring to the modification illustrated in Figs. 18 and 19:—Extending through recesses 34 in the shaft enlargement or collar 5 are bushes 35 in which are slidably disposed wooden or metal kneading pieces 36 the respective ends whereof abut against "cam"-shaped members 2, 3. Formed on or secured to each of said bushes 35 is an externally-toothed or spur wheel 37, and surrounding the interior of the casing 1 is a common internally-toothed wheel 38 which is held in position by means of a pin 39. When said central shaft 4 is rotated, and with it the enlargement or collar 5, said kneading pieces 36, through the engagement of their toothed bushes with the common internally-toothed wheel 37 are simultaneously revolved, both around the casing and on their own axes and are also reciprocated by the "cam"-shaped members 2, 3.

It will be noted that said blades 36 are of special shape or configuration and are of such width, and are so set or timed, that when the mixing or kneading operation is completed one at least will be in a position to discharge the contents—through conduit 40 in which is a plate valve 41—on said internally-toothed wheel 37 being released and so freed to revolve through the withdrawal of said pin 39. On the rotation of said wheel 37 said kneading pieces 36, of course, cease to revolve on their own axes.

Referring to Fig. 20, a part of the hollow portion $4^a$ of shaft 4 is removed and there is substituted a stationary receptacle 42 having a frontal lip 43 and upper and lower apertures 44, 45, respectively. A sliding plate closure 46 is provided in connection with the upper aperture 44. The material to be treated is placed in receptacle 42 through the frontal opening and gravitates through the lower port 45 to the machine, the upper port 44 being closed by slide 46. On completion of the treatment said upper port 44 is opened and the material is permitted to discharge on an inclined portable board.

Referring to the construction shown in Fig. 21 said "cam"-shaped members are each formed of two parts 2, and $2^a$, and 3 and $3^a$ respectively. There are two sets of blades 7, $7^x$ the inner set 7 being operated upon longitudinally by the inner portions 2 and 3 of the "cam"-shaped members, and the outer set of blades $7^x$ being actuated by the outer portions $2^a$ and $3^a$ of said "cam"-shaped members. The machine is charged when the cam peaks are at an angle of 180° to each other, and when the valley of the outer portion of a "cam"-shaped member is on top and the peak of the inner portion of the "cam"-shaped member is also at the top, as shown, in which position the full charge is taken into the machine and finished.

To effect discharge from the machine the inner portions of the cams are revolved through an angle of 180° which causes the peaks and the valleys of the outer and inner portions to coincide, such coincidence causing the machine to eject its charge through passages 40.

Alternatively, a suitable fin-like member 42 may be moved to project beyond the profile of the cam and complete the chamber in the vicinity of the peak and the discharge passage 8, to effect discharge of material instead of operating the inner cam $2^a$ for that purpose.

What I claim as my invention and desire to secure by Letters Patent is:—

1. A machine of the type described, comprising a casing, cam members therein and one of said cam members provided with a discharge opening, and a rotary member between said cam members adapted to be reciprocated when rotated.

2. A machine as called for in claim 1 wherein a driven shaft extends axially of said cam members for imparting rotation to said rotary members.

3. A machine of the type described, comprising a casing, cam members fixed in said casing in spaced relation to each other, a driven shaft journaled in said cam members, means about said shaft adapted to be rotated thereby and caused to reciprocate by virtue of said cam members, and hoppers communicating with the space between said cam members.

4. A machine as called for in claim 3 wherein one of said cam members has a discharge opening, and means controlling the discharge.

5. A machine of the type described comprising a casing, a rotary member in said casing adapted to be reciprocated when rotated, and means in said casing causing reciprocation of said rotary member when rotated, said means affording an outlet for said casing.

6. A machine of the type described comprising a casing provided with a discharge opening, a rotary member in said casing adapted to be reciprocated when rotated, a cutter co-axially of said rotary member outside of said casing at the discharge opening thereof, and means in said casing causing reciprocation of said rotary member when rotated, said means affording an outlet at the discharge opening of said casing.

7. A machine of the type described comprising a casing, a cam member fixed in said casing and provided with a discharge opening, a driven shaft journaled in said cam member, and means about said shaft adapted to be rotated thereby and caused to reciprocate by virtue of said cam member.

In testimony whereof I affix my signature in the presence of two witnesses.

SAMUEL FLOOD.

Witnesses:
I. D. FLOOD,
JOHN H. WALKER.